United States Patent [19]

Colombo

[11] Patent Number: 4,747,983
[45] Date of Patent: May 31, 1988

[54] PROCESS AND APPARATUS FOR MANUFACTURING FOAMED STRUCTURES WITH INTEGRAL SKIN

[75] Inventor: Edward A. Colombo, Fairport, N.Y.

[73] Assignee: Mobil Oil Corporation, New York, N.Y.

[21] Appl. No.: 814,717

[22] Filed: Dec. 30, 1985

[51] Int. Cl.$^4$ .......................... C08J 9/34; B29C 67/22; B29C 47/14; B29C 47/20

[52] U.S. Cl. .................................. 264/45.5; 264/45.9; 264/50; 264/53; 264/173; 264/DIG. 5; 425/4 C; 425/84; 425/817 C

[58] Field of Search ................... 264/51, 53, 45.5, 338, 264/50, 48, 45.9, 173, DIG. 5; 425/4 C, 84, 817 C

[56] References Cited

U.S. PATENT DOCUMENTS

| | | |
|---|---|---|
| 2,537,977 | 1/1951 | Dulmage .......................... 264/338 X |
| 3,030,623 | 4/1962 | Lehti et al. ...................... 264/338 X |
| 3,054,142 | 9/1962 | Hinderer et al. ............ 264/DIG. 42 |
| 3,299,192 | 1/1967 | Lux ........................................... 264/48 |
| 3,466,705 | 9/1969 | Richie .................................. 264/50 X |
| 3,857,914 | 12/1974 | Aishima et al. ................. 425/4 C X |
| 4,022,858 | 5/1977 | Cavanna et al. ........................ 264/51 |
| 4,344,710 | 8/1982 | Johnson et al. ........................ 264/53 |
| 4,352,893 | 10/1982 | Johnson et al. ...................... 264/455 |

Primary Examiner—Philip Anderson
Attorney, Agent, or Firm—Alexander J. McKillop; Michael G. Gilman; Stanislaus Aksman

[57] ABSTRACT

A foamed thermoplastic article having an integral outer unfoamed skin layer is formed from a mixture of thermoplastic resin containing a blowing agent by removing at least a portion of the blowing agent in the die of the extruder. The blowing agent is removed, e.g., by modifying the die so that it incorporates a porous section whcih allows the blowing agent to be removed from the mixture.

17 Claims, 2 Drawing Sheets

PROCESS AND APPARATUS FOR MANUFACTURING FOAMED STRUCTURES WITH INTEGRAL SKIN

BACKGROUND OF THE INVENTION

1. Field of the Invention

This invention is related to the production of thermoplastic foam. More particularly, it is related to the production of thermoplastic film or sheeting having an integral skin layer on the surface of film or sheeting.

2. Description of the Prior Art

It is known to extrude certain thermoplastic resins directly into foam-form film or sheeting by plastifying the resin, blending it with a suitable nucleating agent and blowing agent, and extruding this blend through an appropriate size die under such conditions as to form the extrudates into film or sheet form while foaming it. In one particular modification of this generally known process, the blend is extruded through a circular (annular) die gap to produce a tubular foam-form film or sheeting extrudate. The tubular extrudate is then passed over a forming mandrel having a cooling fluid passing therethrough. In this process, it is common for the forming mandrel to have such a diameter as to necessitate the tubular film being stretched to fit over the mandrel.

After the tubular foam-form extrudate passes over the forming mandrel and is cooled to a sufficient extent so that the foam form character thereof is substantially stable, the tube is conventionally slit in the longitudinal direction, spread flat and wound on a take-up roller means. It is known that the stretching of the tubular extrudate over the forming mandrel and/or the winding of the flattened foam-form material on the take up means causes the thus formed film or sheeting to have been oriented in the longitudinal and transverse directions.

Attempts have been made in the past to produce such thermoplastic foam-form film or sheeting having a skin layer on the surface thereof. The skin layer is unfoamed, while the underlying thermoplastic film or sheeting is foamed. Such a skin layer improves mechanical properties of the thermoplastic film or sheeting. The skin layer also provides a better printing surface than the foamed film or sheeting underneath the skin layer. Several different methods have been known for producing such an outer skin layer. For example, Lux, U.S. Pat. No. 3,299,192, discloses the formation of such a skin layer on the thermoplastic foamed pipe by quench chilling the internal and external walls of the tube a short time after it emerges from an extrusion die. Johnson et al, U.S. Pat. No. 4,352,893, disclose the production of superior styrenic polymer foam sheets exhibiting excellent resistance to punctures and improved tensile properties by cooling the extruded foam sheets in a water bath at a temperature from about 40° C. to about 85° C. It has also been proposed to form the outer skin layer by air cooling the surface of the extruded foamed sheet.

One of the potential problems in the production of the skin layers by the aforementioned methods is that the thermoplastic article, i.e., foam-form film or sheeting is later subjected to thermoforming conditions to produce a desired article, as discussed above. During such thermoforming conditions, the article is subjected to elevated temperatures which may promote the foaming of the blowing agent contained in the film surface.

Other methods have also been proposed to obtain a foam-form film or sheeting containing an outer skin layer. For example, it has been proposed to extrusion-coat a non-foaming resin onto a simultaneously-extruded thermoplastic foam-form film or sheeting. In such an operation, the non-foaming resin is coextruded simultaneously with the foamed film or sheeting in the same extruder or through two different extruders. However, one of the disadvantages of the resulting article is that the film surface is non-oriented and, therefore, it exhibits inferior mechanical properties as compared to oriented articles.

Another previously-proposed method for providing a foam-form film or sheeting having a surface skin layer was heat-lamination of the skin layer onto the foam-form film or sheeting, each previously produced independently of each other. In such a process, two separate process operations are necessary for the production of the article having an integral skin surface, thereby contributing to the high overall cost of the final article.

Accordingly, it is a primary object of the present invention to provide an improved process and apparatus for producing thermoplastic foam-form film or sheeting having an integral skin.

Additional objects of this invention will be apparent to those skilled to the art from the following description thereof.

SUMMARY OF THE INVENTION

In accordance with the present invention, a method of producing a thermoplastic article, e.g., a foam-form film or sheeting, in an extruder containing a die means is improved by removing at least a portion of the blowing agent from a mixture of a plastified thermoplastic resin containing a blowing agent. The portion of the blowing agent is removed from the mixture, thereby producing a surface skin layer on the thus-produced foam-form film or sheeting. The surface skin layer has substantially no blowing agent and, therefore, it is not likely to undergo foaming during subsequent thermoforming operations.

DETAILED DESCRIPTION OF THE INVENTION

The blowing agent is removed by providing in the die a suitable means for removing the blowing agent from the mixture. Such a suitable means could include, for example, a vacuum conduit placed in the die in contact with the surface of the plastified stream of the thermoplastic resin or a perforated, permeable, porous section in the die. In the most preferred embodiment, the die is modified by providing in it a section of a porous material (porous section) which allows the blowing agent to escape from the mixture of the plastified thermoplastic resin. Thus, the invention will be described herein in connection with this most preferred embodiment. However, it will be apparent to those skilled in the art that it is not limited to the use of the porous section in the die means and that any means of removing the blowing agent from the mixture may be utilized herein.

Figure 1:
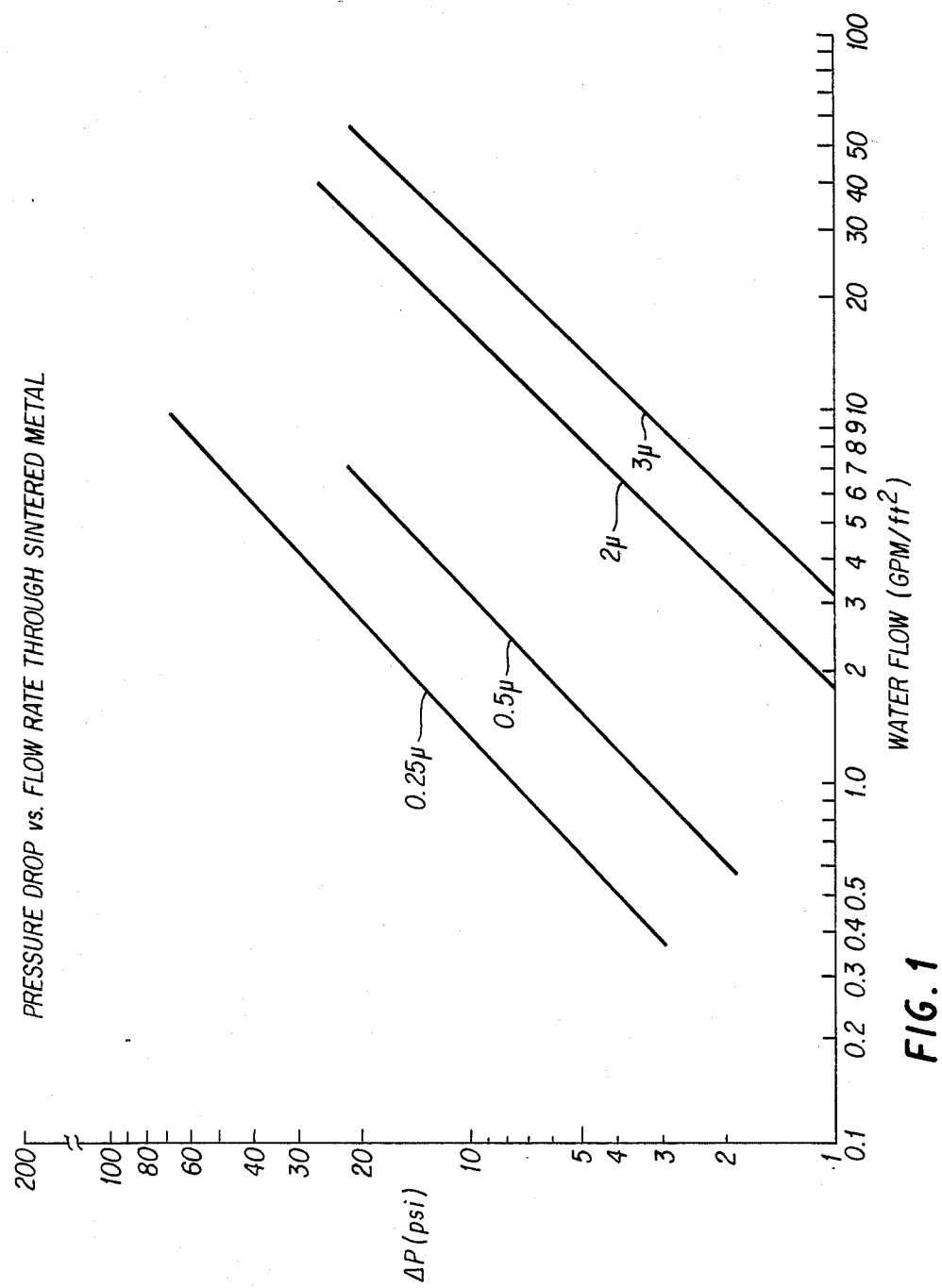
FIG. 1 is a representation of flow curves for water of the porous media having standard micron grades of 0.25, 0.5, 2.0 and 3.0 microns.

The porous section must have such a permeability that it allows molecules of the blowing agent to be removed through the porous section but does not allow molecules of the thermoplastic resin to be removed through the porous section. As used herein, the term "permeability" is defined as the resistance to passage of flow of a specific fluid per unit of area (see Catalog 1000A, entitled *Engineering with Precision Porous Metals*, published by MOTT METALLURGICAL CORPORATION, Farmington, Conn. 06032, the entire contents of which are incorporated herein by reference). Thus, as will be apparent to those skilled in the art, the exact permeability of the porous section will depend upon the type of the thermoplastic resin processed in a particular extruder and die. For most thermoplastic resins, the porous section must have such a permeability as is defined by the flow curves for water, in FIG. 1, of the porous media having standard micron sizes of between about 0.25 to about 3 microns, preferably about 0.5 to about 2 microns, and most preferably about 0.5 microns.

The length of the porous section will depend, as will be apparent to those skilled in the art, on the temperature of extrusion process and speed of extrusion. For each specific application, as is also known to those skilled in the art, the temperature and the speed of extrusion are different and therefore the appropriate length of the porous section must be experimentally established for each specific application. However, the length of the porous section must be such as to provide an extruded article, e.g., a foam-form film or sheeting having an integral skin layer, uniformly deposited on the surface thereof. The length of the porous section can also be adjusted to produce a skin layer having the desired thickness. As will be apparent to those skilled in the art, the longer the length of the porous section, the more blowing agent is removed therethrough, thereby producing the thicker skin layer on the surface of the film or sheeting. The skin layer preferably has the thickness of about 0.1 to about 1.25, most preferably about 0.5 to about 1.0 mils.

The density of the skin layer, which is substantially unfoamed, is substantially greater than the density of the underlying foam-form film or sheeting. Thus, when the film or sheeting is made from a styrenic polymer, it has the density of about 3 to about 6 lbs/ft.$^3$, while the surface film layer has the density of about 15 to about 65 lbs/ft$^3$.

It will be apparent to those skilled in the art that this invention can be used with any suitable die means. Thus, for example, capillary, annular and slit dies may be used. If the invention is used with a capillary die means, the porous section will produce an outer skin layer on the extruded, cylindrically-shaped article. If an annular die means is used, it may contain one or more porous sections, e.g., it may contain one porous section on the inner surface thereof, one porous section on the outer surface thereof or two porous sections, one on the inner and one on the outer surface, respectively, of the annular die means. For example, if the annular die means contains two porous sections, it will produce a tubular extrudate having unfoamed surface skin layers on the inner and outer surfaces thereof. Similarly, if a slit die means is used, it may have one or two porous sections incorporated into the upper and/or lower sections of the slit die means.

Foamable thermoplastic resins are generally known in the art. They are exemplified by thermoplastic polyurethanes, polyvinyl chlorides and polystyrenes. Of particular interest in this invention is polystyrene. It is known to foam thermoplastic resins by means of blowing agents which decompose to form a gas byproduct, usually carbon dioxide, or alternatively to cause foaming by the pressure relief vaporization of relatively low boiling materials which had been kept under pressure in liquid admixture with the resin. Conventional blowing agents are utilized in the process of this invention, e.g., pentane, isopentane, carbon dioxide, and Freon. Pentane is the preferred blowing agent used in this invention. As the resin composition passes through the extrusion die from high pressure conditions inside the extruder to substantially ambient, low pressure conditions outside the extruder, the dissolved and/or blended blowing agent in the extruded resin suddenly vaporizes to foam the resin. A conventional nucleating agent is incorporated in the blend to cause foam cell formation. If the resin is polystyrene, the density of the resin blend in the extruder just before it passes through the die is about 65 pounds per cubic foot. The foam produced therefrom has a lower bulk density; how much lower depends upon the amount of foaming and nucleating agent used and the conditions of foaming. It is common in producing polystyrene foam for use in meat trays, egg cartons and similar articles for the foam to have a bulk density of about 3 to 6 pounds per cubic foot, preferably about 4½ pounds per cubic foot.

The styrenic polymers that are particularly useful in the process of this invention comprise thermoplastic homopolymers, copolymers and interpolymers of styrene and substituted styrenics. Various ethylenically-unsaturated organic compounds may be incorporated in styrenic resins, alkyl-substituted styrenes, α-methyl styrene, 4-methyl styrene, vinyl benzenoids and halogenated styrenes. Usually a major portion of the styrenic polymer comprises one or more repeating units having the following structure:

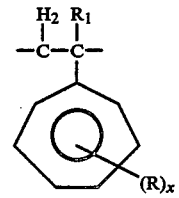

wherein
R is lower alkyl, halogen or hydrogen;
x is an integer from 0 to 5; and
$R_1$ is H or lower alkyl.

Typical lower alkyl groups include $C_1$ to $C_6$ alkyl radicals, especially methyl. Preferred polymeric compositions contain at least 80% styrene or substituted styrene repeating units. The invention is especially useful for homopolymers of styrene and p-methyl styrene.

The extrusion process is conducted in a conventional manner by forming an extrudable foamable mixture of a thermoplastic resin containing a blowing agent and, optionally, a nucleating agent, e.g., talc or a mixture of sodium bicarbonate and citric acid or combinations thereof. The mixture is then extruded through a suitable die means containing a means of removing the blowing agent from the vicinity of the surface of the mixture, e.g., a porous section in the die means.

The extruder is operated at conventional conditions of temperature and pressure used heretofore in operating similar extruders containing suitable die means.

The invention will now be described in connection with one exemplary embodiment thereof illustrated in FIG. 2. However, it will be apparent to those skilled in the art that the scope of the invention is not limited to this exemplary embodiment thereof.

Figure 2:
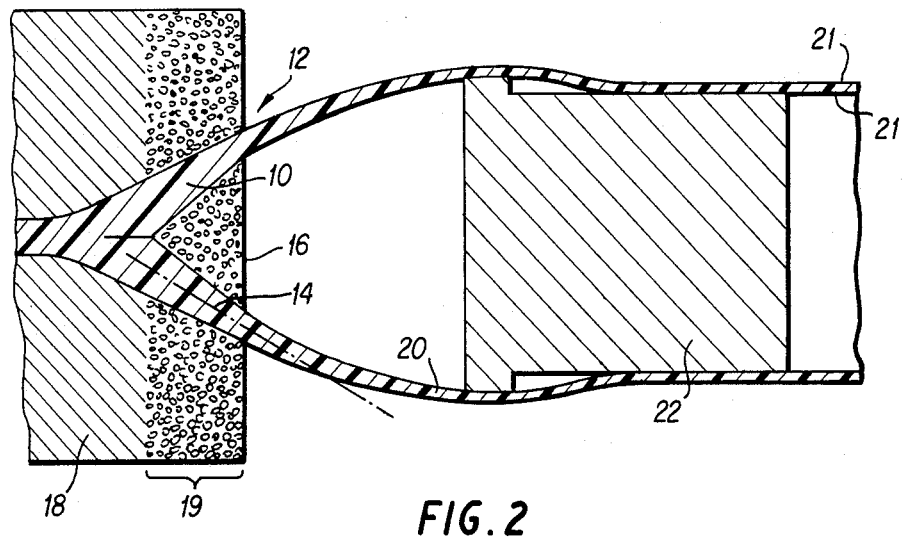
FIG. 2 illustrates one exemplary embodiment of the present invention.

Referring now to FIG. 2, a polymer resin formable composition 10 is plastified in and fed from an extruder (not shown) into an annular die 12 composed of an annular channel 14 having a diameter defined by a central member 16 and an external ring member 18. The polymer 10 issues from the annular die 12 in the form of a foam-form tube 20 which passes about a forming mandrel 22 which, along with windup roller means (not shown), define the final size of the foam tube.

According to the present invention, the central member 16 and the portion 19 of the external ring member 18 are manufactured from a porous material to provide a means for the blowing agent near the surface of the resin foamable composition to be removed therefrom and expelled from the die. Accordingly, the foam-form tube 20 is formed with a transparent, integral skin layer 21 formed on the surface thereof after it passes over the forming mandrel 22. Suitable materials for the formation of the porous portions of the die are those manufactured by Mott Metallurgical Corporation (Mott), Farmington, Conn., referred to by Mott as porous media.

The following examples further illustrate the essential features of this invention. However, it will be apparent to those skilled in the art that the specific reactants and reaction conditions used in the examples do not limit the scope of the invention.

EXAMPLE 1

Manufacture of Foam-Form With Integral Skin Layer

A foam-form having an integral skin layer was manufactured in an extruder containing a capillary die, 6 inches in length, 0.250 inch diameter, modified by incorporating thereinto a 6-inch long section of Mott Metallurgical Corporation's 0.5 microns ($\mu$) standard grade porous media.

Dow 1800 styrene was dry-blended with 0.5% by weight of a nucleating agent. The blend was plastified by heating and hot working it in a first extruder (referred to herein as the "Primary Extruder") at about 400° F. The plastified mixture was then mixed with 5 parts of pentane blowing agent by injecting it into the first extruder at about 2400 psi to form a foamable composition. The foamable composition was then transferred to a second extruder (referred to herein as the "Secondary Extruder") operating at a lower temperature (about 300° F.), where it was cooled. The cooled, foamable composition was then extruded through the aforementioned capillary die into the atmosphere to form a foamed cylinder having a uniform, transparent skin layer. The operating conditions of the two extruders are set forth below.

| Extruder speed (RPM) | |
|---|---|
| Primary | 52 |
| Secondary | 15 |
| Pentane pump | |
| Setting | 7.8 |
| Recorded | 7.8 |
| Extruders' Temperatures (°F.) | |
| A. Primary Extruder Zone 1 | 320 |
| Zone 2 | 360 |
| Zone 3 | 390 |
| Crossover Zone 4 | 300 |
| B. Secondary Extruder Zone 5 | 310 |
| Zone 6 | 290 |
| Zone 7 | 245 |
| Zone 9 | 245 |
| Pressure (psi) | |
| Crossover | 1400 |
| Adapter | 1650 |
| Pentane | 2400 |
| Melt Temperatures (°F.) | |
| Crossover | 280 |
| Adapter | 264 |
| Throughput | 10.35 lbs/hr |
| Nitrogen Purge on Die: Trickle to 200 psi | |

EXAMPLE 2

(Comparative Example)

An attempt was made to manufacture a foam-form having an integral skin layer manufactured in an extruder of Example 1, except that the capillary die of Example 1 was modified by incorporating thereinto a 6-inch long section of Mott Metallurgical Corporation's 20$\mu$ standard grade porous metal media. The apparatus was operated in the manner substantially identical to Example 1. The pertinent operating parameters are set forth below:

| Extruder speed (RPM) | |
|---|---|
| Primary | 51 |
| Secondary | 15 |
| Pentane pump | |
| Setting | 7.8 |
| Recorded | 7.8 |
| Extruders' Temperatures (°F.) | |
| A. Primary Extruder Zone 1 | 320 |
| Zone 2 | 360 |
| Zone 3 | 390 |
| Crossover Zone 4 | 300 |
| B. Secondary Extruder Zone 5 | 310 |
| Zone 6 | 290 |
| Zone 7 | 245 |
| Zone 9 | 245 |
| Pressure (psi) | |
| Crossover | 1350 |
| Adapter | 1790 |
| Pentane | 2600 |
| Melt Temperatures (°F.) | |
| Crossover | 340 |
| Adapter | 277 |
| Throughput | 10.20 lbs/hr |
| Nitrogen Purge on Die = 200 psi. | |

The produced cylindrical article contained no skin layer. The pores of the sintered section of the die were plugged.

EXAMPLE 3

(Comparative Example)

In this example, the capillary die having a diameter of 0.250 inches contained no porous section. The apparatus was operated in the manner substantially identical to that of Examples 1 and 2. The pertinent operating parameters are set forth below:

| Extruder speed (RPM) | |
|---|---|
| Primary | 50–51 |
| Secondary | 15 |
| Pentane pump | |

| -continued | |
|---|---|
| Setting | 7.8 |
| Recorded | 7.8 |
| Extruders' Temperatures (°F.) | |
| A. Primary Extruder Zone 1 | 320 |
| Zone 2 | 360 |
| Zone 3 | 390 |
| Crossover Zone 4 | 300 |
| B. Secondary Extruder Zone 5 | 310 |
| Zone 6 | 290 |
| Zone 7 | 245 |
| Zone 9 | 245 |
| Pressure (psi) | |
| Crossover | 1650 |
| Adapter | 2250 |
| Pentane | 2900 |
| Melt Temperatures (°F.) | |
| Crossover | 390 |
| Adapter | 267 |
| Throughput | 9.3 lbs/hr |

The foamed cylindrical article produced in this example also had no outer skin layer.

The data of Examples 1-3 illustrates that the integral, unfoamed skin layer of this invention is formed in dies having sintered portions of average pore size specified herein. However, if a die is modified with a sintered portion having a pore size large enough to allow the passage of the thermoplastic resin, no skin layer is formed and the pores of the sintered portion become plugged by the thermoplastic resin.

From the foregoing specification, one skilled in the art can readily ascertain the essential features of this invention and without departing from the spirit and scope thereof can adapt it to various diverse applications.

Although the present invention has been described with preferred embodiments, it is to be understood that modifications and variations can be resorted to without departing from the spirit and scope of this invention, as those skilled in the art will readily understand. Such variations and modifications are considered to be within the purview and scope of the appended claims.

What is claimed is:

1. In a method of producing a thermoplastic article from a mixture of a plastified thermoplastic resin containing a blowing agent, the method comprising passing the mixture through an extruder means equipped with a die means,
   the improvement comprising removing in the die means at least a portion of the blowing agent, thereby forming a skin layer on the surface of the article, the die means containing no dividing means within the cross-section of its flow channel, thereby producing the article with the skin layer integrated into the surface of the article substantially upon the commencement of the formation of the skin layer.

2. A method of claim 1 wherein the skin layer has a density substantially greater than the thermoplastic article.

3. A method of claim 2 wherein the blowing agent is removed through a porous section of the die means.

4. A method of claim 3 wherein the porous section has such a permeability that it allows molecules of the blowing agent to be removed through the porous section but does not allow molecules of the thermoplastic resin to be removed through the porous section.

5. A method of claim 4 wherein the porous section has a permeability defined by the flow curves for water, in FIG. 1, of a porous media having standard micron sizes of between about 0.25 to about 3 microns.

6. A method of claim 5 wherein the porous section has a permeability defined by the flow curves for water, in FIG. 1, of a porous media having standard micron sizes of between about 0.5 to about 2 microns.

7. A method of claim 6 wherein the die means is an annular die means.

8. A method of claim 7 wherein the die means has one porous section on the inner and one porous section on the outer surfaces thereof.

9. A method of claim 8 wherein the thermoplastic article has skin layers on the inner and the outer surfaces thereof.

10. A method of claim 9 wherein the surface skin layer has the thickness of about 0.1 to about 1.25 mils.

11. A method of claim 10 wherein the surface skin layer has the thickness of about 0.5 to about 1.0 mils.

12. A method of claim 11 wherein the porous section has a permeability defined by the flow curves for water, in FIG. 1, of a porous media having standard micron sizes of about 0.5 microns.

13. A method of claim 12 wherein the thermoplastic article is made from a styrenic polymer, it has the density of about 3 to about 6 lbs/ft$^3$, and the surface film layer thereof has the density of about 15 to about 65 lbs/ft$^3$.

14. In an extruder means having a die means, containing no dividing means within the cross-section of its flow channel, the improvement comprising providing in the die means a porous section having such a permeability that it allows molecules of a blowing agent to be removed through the porous section but does not allow molecules of a thermoplastic resin to be removed through the porous section.

15. An extruder means of claim 12 wherein the porous section has a permeability defined by the flow curves for water, in FIG. 1, of a porous media having standard micron sizes of between about 0.25 to about 3 microns.

16. An extruder means of claim 14 wherein the porous section has a permeability defined by the flow curves for water, in FIG. 1, of a porous media having standard micron sizes of between about 0.5 to about 2 microns.

17. An extruder means of claim 16 wherein the porous section has a permeability defined by the flow curves for water, in FIG. 1, of a porous media having standard micron sizes of about 0.5 microns.

* * * * *